June 5, 1945.   L. RINGER   2,377,575
TWO SPEED DRIVE AND CLUTCH ASSEMBLY
Original Filed Sept. 23, 1940   4 Sheets-Sheet 1

Inventor
LUTHER RINGER.
by Charles N. Riley
Atty=.

June 5, 1945.    L. RINGER    2,377,575
TWO SPEED DRIVE AND CLUTCH ASSEMBLY
Original Filed Sept. 23, 1940    4 Sheets-Sheet 2

Inventor
LUTHER RINGER.
by Charles Allen Attys.

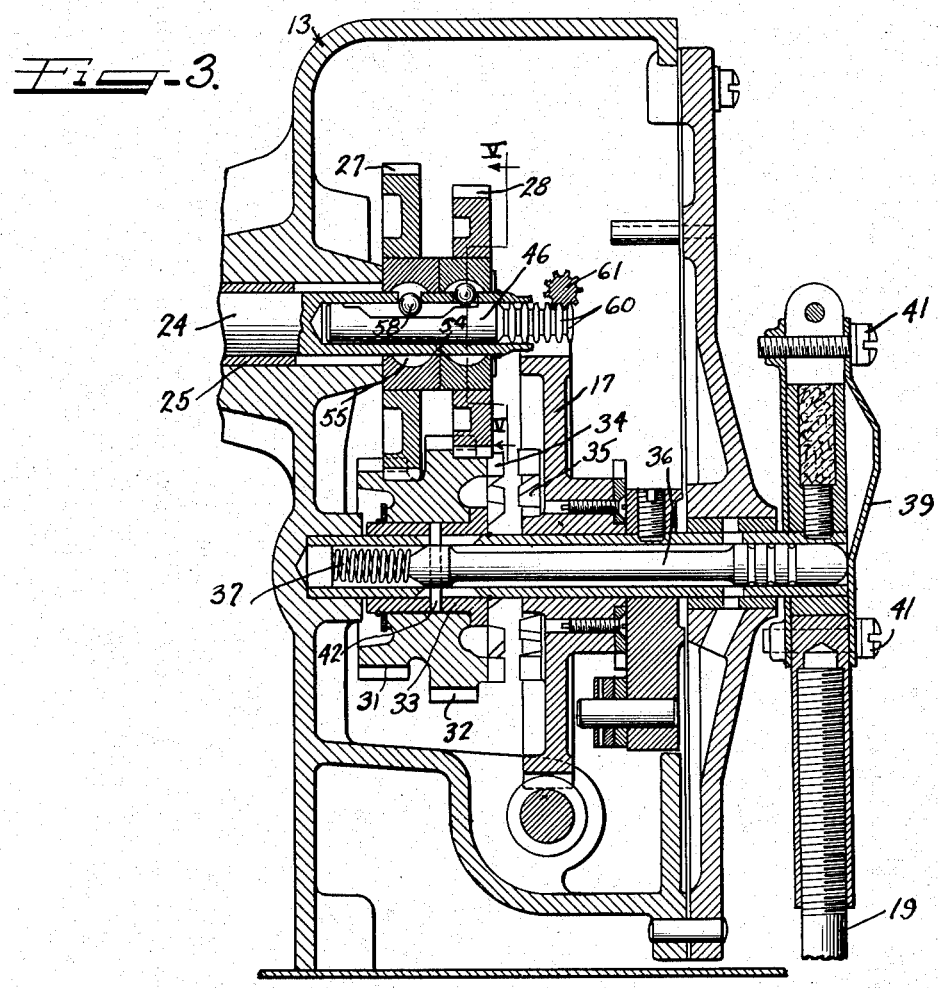
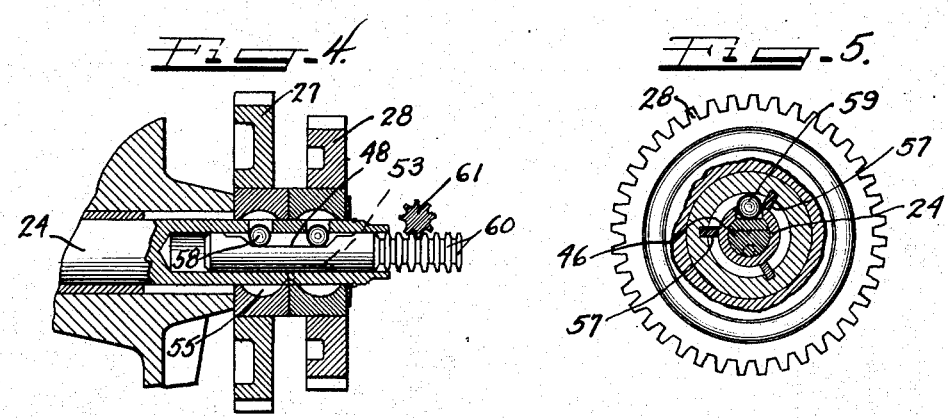

June 5, 1945. L. RINGER 2,377,575
TWO SPEED DRIVE AND CLUTCH ASSEMBLY
Original Filed Sept. 23, 1940    4 Sheets-Sheet 4
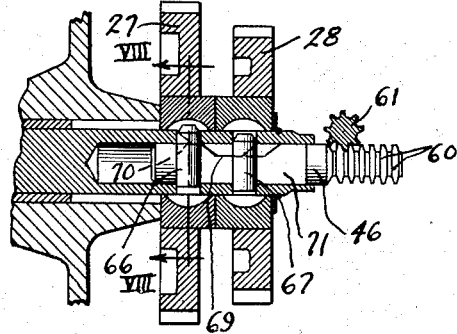
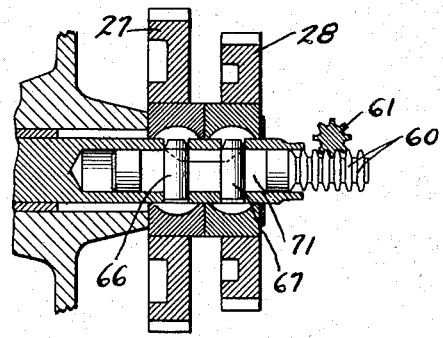
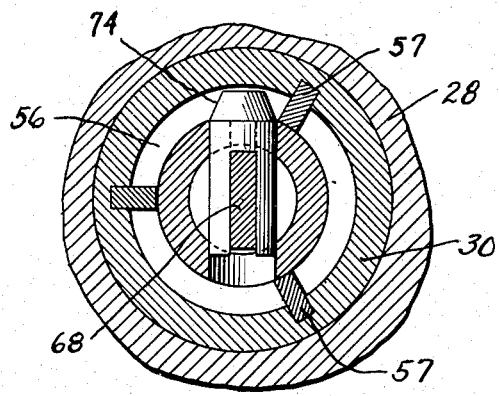
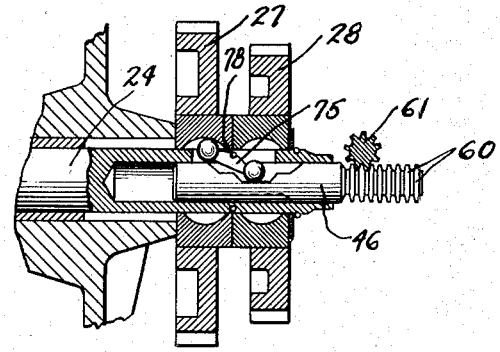
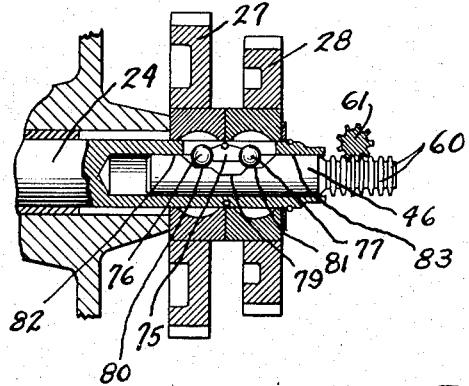
Inventor
LUTHER RINGER.
by Patented June 5, 1945

2,377,575

UNITED STATES PATENT OFFICE 2,377,575

TWO SPEED DRIVE AND CLUTCH ASSEMBLY

Luther Ringer, Berrien Springs, Mich., assignor to Nineteen Hundred Corporation, St. Joseph, Mich., a corporation of New York Original application September 23, 1940, Serial No. 357,932. Divided and this application December 29, 1941, Serial No. 424,773

6 Claims. (Cl. 192—48)

This invention relates to a two speed drive and clutch assembly, and more particularly, to one which is particularly suitable for use in ironing machines of the domestic or home laundry type.

One of the common forms of home laundry ironers comprises a power driven padded roll and a heated shoe, which are moved relative to each other to carry them into and out of pressing engagement. As machines of this type are ordinarily constructed, the roll is mounted on a stationary axis, while the shoe is rocked or otherwise shifted toward and away from the roll. While the common practice is to rotate the roll at a constant speed, usually about six revolutions per minute, it has been found desirable to provide more than one speed of operation for the roll due to the fact that clothes and other articles to be ironed vary greatly in texture, dampness, etc.

One of the principal features of the present invention is to provide a two speed drive and clutch assembly which is particularly adapted and designed for use on a home laundry ironer of the above general type, although this two speed drive and clutch assembly has other applications and uses.

One of the principal objects of the present invention is to provide a novel speed changing mechanism.

Another object of the present invention is to provide a novel two speed drive and clutch assembly.

A further object of the present invention is to provide a novel two speed drive and clutch assembly which is economical to manufacture, simple to operate, and rugged and reliable in use.

Still another object of the present invention is to provide a novel ball clutch speed changing mechanism.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 3 is a view similar to Figure 1, but with the driving mechanism set to operate at a different speed and the eccentric arm in an "up" position with the clutch disengaged;

Figure 4 is a fragmentary sectional view showing the driven gears of the two speed drive in a neutral position;

Figure 5 is a sectional view through the smaller of the two driven gears as taken along the line V—V of Figure 3;

Figures 6, 7 and 8 are fragmentary sectional views of a modified form of gear shift, Figure 6 showing the larger of the two gears in driving engagement, Figure 7 showing the two gears in a neutral position, and Figure 8 being a sectional view as taken along the line VIII—VIII of Figure 6;

Figures 9 and 10 are fragmentary sectional views similar to Figures 6 and 7, but illustrating a third embodiment of the present invention.

The present application is a division of my copending application Serial No. 357,932, filed September 23, 1940, and assigned to the same assignee as the present invention.

The various illustrated embodiments of the present invention are shown as being incorporated in the driving mechanism of an ironing machine of the home laundry type. Since the two speed drive and clutch assembly of the present invention is incorporated only in the driving mechanism of the ironing machine, the entire machine has not been illustrated (a complete description of the entire ironing machine may be seen in applicant's copending application Serial No. 357,932, above referred to).

Figure 1:
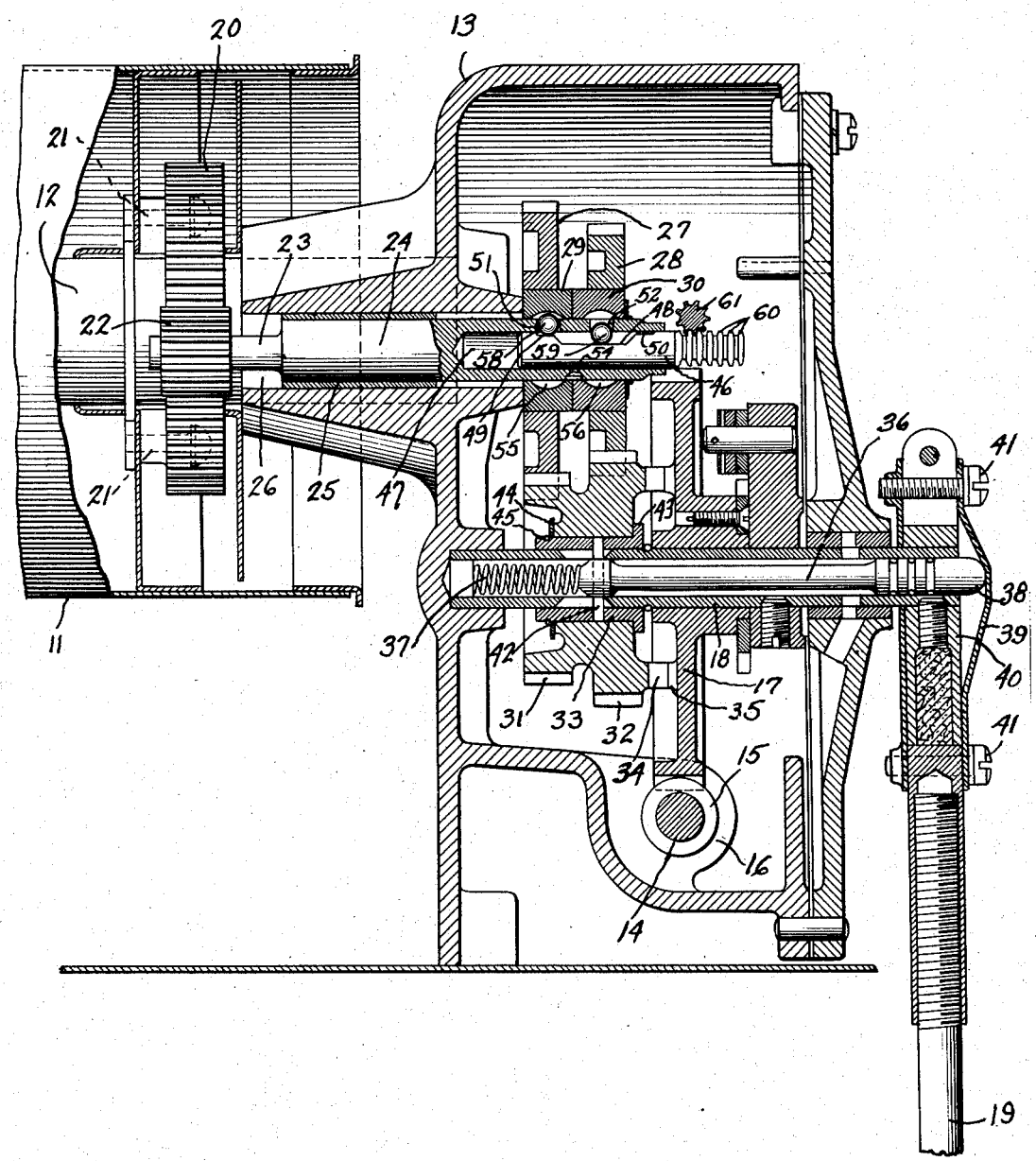
Figure 1 is a front vertical sectional view of the driving and control mechanism of a home laundry ironer which includes the two speed drive and clutch assembly of the present invention.

The portion of the ironing machine which is shown in Figure 1 of the drawings includes a padded roll 11 which is mounted for rotation on a stationary stub shaft 12, which in turn is carried on the stationary frame member and gear housing 13. Power is supplied to the driving mechanism housed within the casing 13 through a drive shaft 14 which has integrally formed thereon a worm 15. The drive shaft 14 is suitably journalled in a pair of projecting portions 16 which are in the form of ears projecting from the inner wall of the casing 13.

The worm 15 is in constant mesh with a worm wheel 17, which is loosely mounted on a hollow shaft 18. The mechanism to the right of the worm wheel 17 will only be briefly referred to for it forms no direct part of the present invention. It is sufficient to state that this mechanism is arranged to move the pressing shoe (not shown) into and out of ironing engagement with the roll 11 by means of the connecting link 19.

The padded roll 11 is driven through a large gear 20 which is bolted to the end of the roll frame, as at 21. The large gear 20 is constantly in mesh with a pinion gear 22 keyed or otherwise rigidly secured to the reduced end portion 23 of the drive shaft 24. The drive shaft 24 is journalled in a sleeve bearing 25 which in turn is held in an opening 26 in the housing 13. Rotatably mounted on the opposite end of the shaft 24 from the end on which the pinion 22 is mounted are a pair of gears 27 and 28. Each of the gears 27 and 28 is shown as being provided with separate hub portions 29 and 30, respectively, upon which the outer portions of each of the gears are sweated or otherwise rigidly secured. These gears 27 and 28 may be selectively placed in driving cooperation with the drive shaft 24 by a ball clutch mechanism presently to be described.

Gears 27 and 28 are constantly in mesh with a cooperating set of gears 31 and 32, which are rotatably mounted on a sliding sleeve bearing or bushing 33. As is clearly shown in Figures 1 and 2 of the drawings, the gears 31 and 32 are preferably formed integral with each other from a single piece of metal to form a single one-piece unit. The sleeve bearing or bushing 33 is mounted on the hollow shaft 18 and arranged for limited axial movement thereon. The face of the gear unit 31, 32 which lies opposite the worm wheel 17 is provided with jaw clutch teeth 34, which cooperate with a complementary set of jaw clutch teeth 35 formed on the worm wheel 17. It will thus be understood that whenever the jaw clutch sleeves 34 and 35 are in engagement with each other, the gears 31, 32 are rotated with the worm wheel 17. These gears, in turn, cause both of the gears 27 and 28 to be rotated.

Engagement and disengagement of the jaw clutch teeth 34 and 35 is brought about by a control shaft 36 which is mounted and contained within the hollow shaft 18. The inner end of the control shaft 36 is seated in the end of a coil spring 37 mounted in the end of the hollow shaft 18. The opposite end of the control shaft 36 projects out of the end of the hollow shaft 18 and is provided with a semispherical end 38, which bears against a cam plate 39. The cam plate 39 is mounted on the outer face of an eccentric member 40 by a bolt 41. The cam member 40 is a part of the mechanism previously referred to for moving the pressing shoe of the ironer into and out of engagement with the roll 11. For the purposes of the present invention, it is simply necessary to understand that the eccentric member 40 is selectively moved into the position as shown in Figure 1 when the pressing shoe is disposed against the roll 11 and is moved to the position shown in Figure 3 when the pressing shoe is moved out of engagement with the roll 11.

Figure 2:
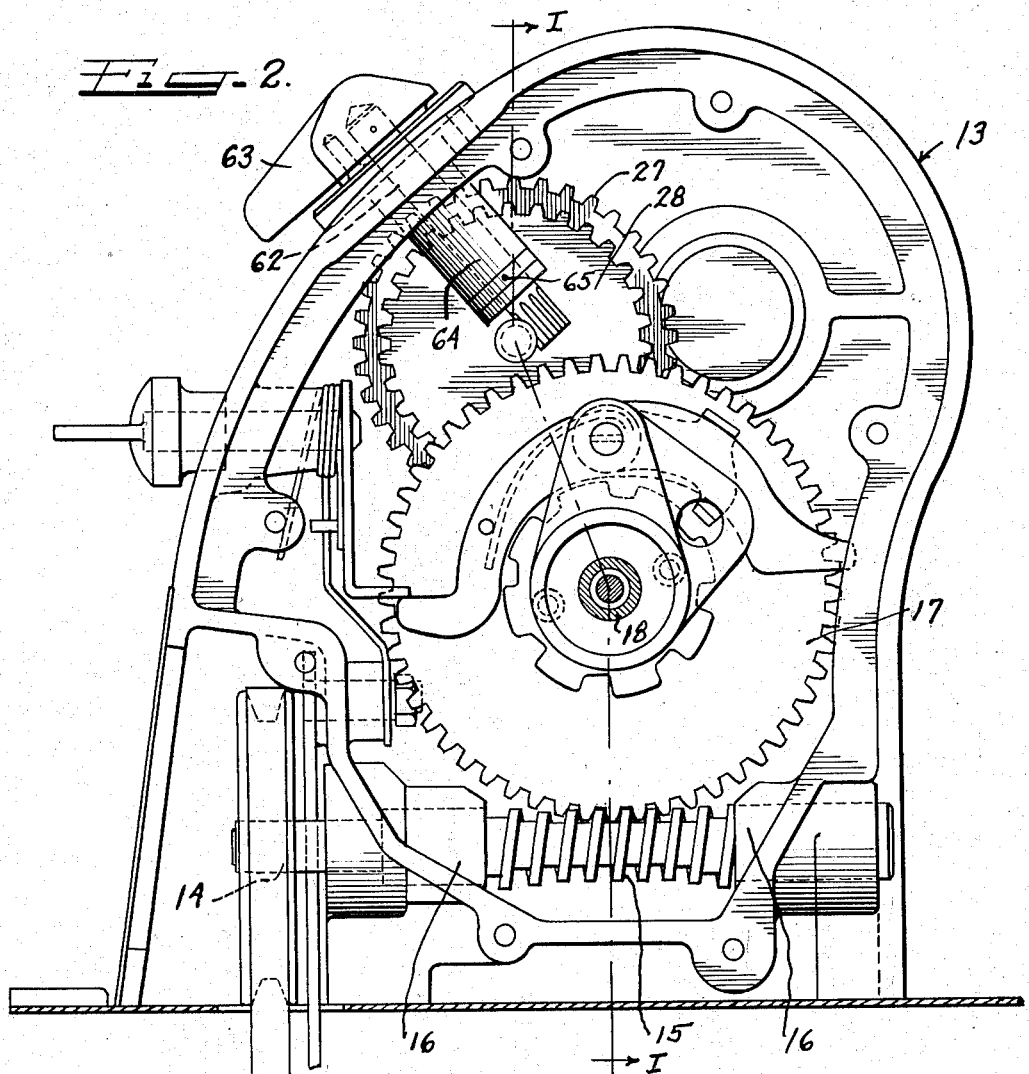
Figure 2 is an enlarged side view of the driving and control mechanism with the inner cover plate removed.

The sleeve bearing or bushing 33, upon which the gears 31 and 32 are rotatably mounted, is keyed or pinned to the control shaft 36 as at 42. It will thus be understood that by longitudinally or axially shifting the control shaft 36, the jaw clutch teeth 34 may be engaged and disengaged from the jaw clutch teeth 35 of the worm wheel 17. The cam plate 39 is so constructed that when the eccentric 40 is in its lowermost position as shown in Figure 1, the control clutch shaft 36 is in its extreme right-hand position (as viewed in Figure 1) and the jaw clutch teeth 34 are in locking engagement with the complementary jaw clutch teeth 35 of the worm wheel 17. When the eccentric 40 is rotated through 180°, or is in its uppermost position as shown in Figure 2, the cam plate 39 forces the control shaft 36 axially inwardly and causes disengagement of the jaw clutch teeth 34 from the complementary jaw clutch teeth 35 on the worm wheel 17. In this position the gears 31 and 32 come to rest, and the rotation of the padded roll 11 stops, since it is no longer being driven from the worm wheel 17.

The gear unit 31, 32 is retained in desired position on the sleeve bearing or bushing 33 by providing a shoulder 43 at one end of the sleeve bearing 33 and by a washer and lock ring 44 and 45, respectively, at the other end.

As will at once be understood by those skilled in the art, the transmission formed by gears 27, 28, 31 and 32 provides a two speed drive due to the different gear ratio between the mating gears 27 and 31, and the other set of gears 28 and 32.

A novel ball clutch mechanism is provided for selectively connecting either gear 27 or gear 28 to the drive shaft 24. In Figures 1 to 5 of the drawings, it will be observed that a ball clutch control shaft 46 is slidably mounted in an axial bore or recess 47 formed in the end of the drive shaft 24. This ball clutch control shaft has an intermediate deep cut blank shoulder 48 and two flat shoulders 49 and 50. Openings 51 and 52 are provided through the drive shaft 24 under the hubs 29 and 30, respectively, of gears 27 and 28. The ball clutch control shaft 46 is keyed to the drive shaft 24 as at 53, so as to prevent relative rotation between the ball clutch control shaft 46 and the drive shaft 24. The key 53 may be held and placed in any suitable manner, such as by means of a set screw 54.

A shallow, circumferentially disposed channel is formed on the radial inward faces of the hubs 29 and 30, as at 55 and 56. Mounted within each channel 55 and 56 are a plurality of partitions or walls 57, which make a smooth running fit with the drive shaft 24 (see Figure 5). A pair of balls 58 and 59 are carried in the assembly in the openings 51 and 52. When one of these balls is pushed up though one of the openings 51 and 52, the ball is engaged by one of the walls or partitions 57, and thereafter the drive shaft 24 will be driven by the gear carrying the projection engaging the ball. When the ball is dropped down so that no portion thereof projects out through the drive shaft 24, the gear will rotate freely around the drive shaft 24 without driving the same. The shoulders 48, 49 and 50 on the ball clutch control shaft 46 provide a convenient mechanism for forcing the balls 58 and 59 upwardly through the openings 51 and 52 when desired. When the control shaft 46 is in the position as shown in Figure 4, both of the balls 51 and 52 are seated on the intermediate deep cut shoulder 48. For that reason, both of the gears 27 and 28 are free to rotate on the drive shaft 24, and will not drive the same. This represents the neutral position of the ball clutch control shaft 46. It will be observed from an inspection of Figure 4 that since balls 58 and 59 never come quite half way out of the openings 51 and 52, they will be forced back into the openings 51 and 52 by the partitions 57 unless positively held in their outer positions by one of the shoulders 49 or 50.

When the ball clutch control shaft 46 is moved to the right to the position as shown in Figure 1, the ball 58 rides up off of the shoulder 48 and onto the shoulder 49. In this position, the gear 27 will be connected to the drive shaft 24 through one of its partitions 57, the ball 58, and the wall of the opening 51. The ball 59 is still seated on the deep cut intermediate shoulder 48, and for that reason, gear 28 which is being rotated at a different speed from that of gear 27, will not be connected in driving engagement with the drive shaft 24. This represents the low speed connection for the rotary drive.

When the ball clutch control shaft 46 is moved to the position as shown in Figure 3 of the drawings, the ball 58 moves down onto the deep cut intermediate shoulder 48, but the ball 59 rides up onto the shoulder 50 and causes a driving connection between the gear 28 and the drive shaft 24. This provides the high speed drive for the roll 11.

Movement of the ball clutch control shaft 46 is obtained by providing a plurality of circumferentially extending ribs or ring flanges 60, which mesh with a small pinion 61. The pinion 61 is mounted on a shaft 62, which passes through the wall of the casing 13 and carries a speed selection control knob 63 (see Figure 2). The shaft 62 is conveniently mounted in a boss 64 carried by the casing 11, and a pin 65 is provided on the shaft 62 for limiting the turning movement thereof.

It will, of course, be understood that whenever the drive shaft 24 is rotated, the ball clutch control shaft 46 is also rotated so that the ribs or ring flanges are rotating between the teeth of the pinion gear 61 (without, of course, turning the pinion).

In Figures 6, 7 and 8, I have illustrated a modification of the gear shift ball clutch assembly which has just been described. More specifically, a pair of plungers 66 and 67 are employed in place of the balls 58 and 59. The central portion of the control shaft 46 is cut back to form a flat bar portion 68. An intermediate shoulder 69 is cut into the bar portion 68 in the same manner as the intermediate shoulder 48 is formed in the preferred embodiment of the present invention. Two end shoulders 70 and 71 are provided by the upper edge of the bar portion 68 on either side of the intermediate shoulder 69. Shoulders 70 and 71 are connected to shoulder 69 by a sloping side portion.

Figure 11:
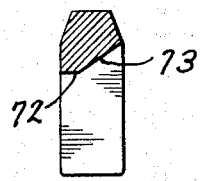
Figure 11 is a vertical sectional view through the right-hand plunger shown in Figure 6.

The plungers 66 and 67 are slotted out to enable them to be seated in straddling engagement over the bar portion 68 of the control shaft 46. The inner end of the slot formed in each of the plungers 66 and 67 has a flat shoulder portion 72 and an inclined shoulder portion 73. A sectional view through the plunger 67 is shown in Figure 11. The plunger 66 is the same as the plunger 67, but with the inclined portion 73 reversed with respect to the flat portion 72.

The flat portion 72 of each of the plungers 66 and 67 are arranged to be seated on one of the shoulders 69, 70 or 71, depending upon the position of the control shaft 46 in the axial bore of the drive shaft 24. The inclined portions 73 of the plungers 66 and 67 form a cam surface which causes the plungers 66 and 67 to ride up and down the sloping connecting surfaces between the shoulders 70 and 69 and 71 and 69. The ends of plungers 66 and 67 are slightly tapered as at 74 to enable the partitions 57 to force the plungers tightly against the bar portion 68 of the control shaft 46.

Figure 7 of the drawings illustrates the speed changing mechanism in its neutral position with both of the plungers 66 and 67 out of engagement with the gears 27 and 28.

Figure 6 of the drawings illustrates the low speed gear in driving connection with the drive shaft 24. To place the high speed gear 28 in driving connection with the drive shaft, the control shaft 46 is moved to its extreme inner position in the end of the drive shaft 24, thereby causing the plunger 67 to ride upon the shoulder 71 and plunger 66 to fall down into the intermediate shoulder 69.

A further modification of the speed changing mechanism is shown in Figures 9 and 10 of the drawings. In this case, a rocker arm 75 is employed having rounded or ball-like ends 76 and 77. This rocker arm 75 is preferably pivotally seated on a snap ring 78 which retains it in desired position with respect to shaft 46. The rounded or ball-like ends 76 and 77 correspond to the balls 58 and 59 of the first embodiment of the invention and the plungers 66 and 67 of the second embodiment of the invention. The central portion of the control shaft 46 includes a deep cut portion 79, two intermediate shoulders 80 and 81, which are connected to the deep cut portion 79 by sloping surfaces, and two other shoulder portions 82 and 83 which are formed by the outer surface of the control shaft 46.

It will be noted that in this form of the invention an extra deep cut central portion is necessary which does not appear in the form of the construction shown in the previously described embodiments of the present invention. This becomes necessary due to the fact that when one ball-like end of the rocking member 75 moves upwardly through the opening in the drive shaft 24, the opposite end moves downwardly (i. e., radially inwardly) an equal amount. This radial inward movement must be taken care of by this deep cut central portion 79 of the control shaft 46.

The gear shifting mechanism as shown in Figure 9 of the drawings has the ball-like end 76 on the upper shoulder 82, which places the low speed gear 27 in driving connection with the drive shaft 24. The opposite end of the rocker arm 75, namely, the ball-like end 77, is down in the deep cut central portion 79. In Figure 10 of the drawings, the rocker arm 75 is in its neutral position, and both of the gears 27 and 28 are riding free on the drive shaft 24. The high speed gear 28 is placed in driving connection with the drive shaft 24 by moving the control shaft to its innermost position in the end of the drive shaft 24, which causes the ball-like end 77 to ride upon the top shoulder 83.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. The combination comprising a support, a shaft journaled on said support and having an axial bore in one end thereof, a plurality of members rotatably and independently mounted on said shaft over the axially bored portion thereof, said members having a radially inwardly facing annular channel forming an annular chamber with said shaft, said shaft having a plurality of spaced radial openings extending between said axial bore and said annular chambers, each of said members being provided with a fixed transverse partition in said annular chamber, clutch members carried by said shaft in said radial openings, and a control shaft slidably mounted in said axial bore and being cut away to provide a relatively flat clutch engaging surface at one depth from the outer surface of the control shaft and a pair of second clutch engaging surfaces at a less depth than said first depth and adjacent the ends of said first clutch engaging surface, said control shaft being movable axially to selectively force one of said clutch members partially out of its radial opening upon said clutch member sliding from contact with said first clutch engaging surface to contact with one of said second clutch engaging surfaces where it will be engaged by a partition of the member lying thereover, thereby connecting said shaft in driven cooperation with said one of said members, the control shaft surfaces between the outer ends of the second clutch engaging surfaces and the outer surface of the control shaft cooperating with the clutch members to limit the axial movement of the control shaft, said axial length of said first clutch engaging surface being substantially equal to the distance between said spaced radial openings in said shaft for accommodating all said clutch members on said first clutch engaging surface at one time so as to minimize the axial travel necessary for successively operating said clutch members.

2. The combination comprising a support, a shaft journaled on said support and having an axial bore at one end thereof, a plurality of members rotatably and independently mounted on said shaft over the axially bored portion thereof, said members having a radially inwardly facing annular channel forming an annular chamber with said shaft, a portion of said shaft being cut out to communicate said axial bore with said annular chamber, each of said members being provided with at least one fixed transverse partition across said annular chamber, locking elements carried by said shaft in said cut-away portion and arranged to be moved partially out of said shaft into said annular chamber for engagement with one of the transverse partitions of said members, and a control shaft having on one side only thereof an intermediate deep-cut shoulder portion and additional shoulder portions of less depth on either side of said intermediate shoulder portion and connected thereto by sloping surfaces, said control shaft providing cam means for selectively projecting one of said locking elements out of said shaft to cause the member engaged thereby to be connected in driving relation with said first shaft.

3. The combination comprising a support, a shaft journaled on said support and having an axial bore in one end thereof, a plurality of members rotatably and independently mounted on said shaft over the axially bored portion thereof, said members having a radially inwardly facing annular channel forming an annular chamber with said shaft, said shaft having a plurality of radial openings extending between said axial bore and said annular chamber, a ball confined in each of said radial openings, each of said members being provided with at least one fixed transverse partition across said annular chamber, and a cam member having on one side only thereof an intermediate deep cut shoulder portion and additional shoulder portions of less depth on either side of said intermediate shoulder portion and connected thereto by sloping surfaces, said cam member slidably mounted in said axial bore to selectively force one of said balls partially out of said shaft into engagement with the transverse partition of one of said members, thereby to connect said one of said members in driving cooperation with said shaft.

4. The combination comprising a support, a shaft journaled on said support and having an axial bore in one end thereof, a plurality of members rotatably and independently mounted on said shaft over the axially bored portion thereof, said members having a radially inwardly facing annular channel forming an annular chamber with said shaft, said shaft having a slotted-out portion connecting said axial bore with said annular chamber, a rocker arm pivotally mounted at its center in said shaft and arranged to have one of its ends rocked to project out of said shaft, each of said members being provided with at least one fixed transverse partition across said annular chamber, and a cam member slidably mounted in said axial bore and having cam shoulders on which said rocking arm is seated, said cam member being movable axially to selectively force one end or the other of said rocking arm partially out of said shaft where it will be engaged by the partition of one of said members, thereby to connect said one of said members in driving cooperation with said shaft.

5. In a two speed drive and clutch assembly, a driven shaft journaled in a support and having an axially extending bore, a pair of driving gears rotatably and independently mounted on said shaft over said axial bore, said gears having inwardly facing recesses, said shaft having spaced radial openings communicating between said bore and said gear recesses, a pair of clutch members positioned in said recesses and adapted to couple said shaft with said gears upon being forced outwardly into said gear recesses, a control shaft slidably mounted in said axial bore and being cut away to provide a relatively flat cam surface at one depth from the outer surface of the control shaft and a pair of second cam surfaces at a less depth than the first depth and adjacent the ends of said first cam surface, said control shaft being axially movable in one direction to cause one clutch member to ride from said first cam surface to one of said second cam surfaces to connect one gear with said shaft and axially movable in the opposite direction to cause the other clutch member to ride from said first cam surface to the other of said second cam surfaces to connect the other gear to said shaft, said axial length of said first cam surface being substantially equal to the distance between said spaced radial openings in said shaft so as to accommodate both clutch members on said first cam surface for a neutral position, a plurality of circumferentially extending ribs on said shaft, a pinion meshing with said ribs, said pinion being carried on a shaft disposed perpendicularly to said control shaft so that rotation of the pinion will move said control shaft axially but rotation of the control shaft will cause the ribs to slide on the pinion without rotating it.

6. The combination comprising a support, a shaft journaled on said support and having an axial bore in one end thereof, a plurality of members rotatably and independently mounted on said shaft over the axial bored portion thereof, said members having inwardly facing recesses, a portion of said shaft being cut out to communicate between said bore and said member recesses, locking elements carried by said shaft in said cut away portion and arranged to be moved partly out of said shaft into said recesses for engagement therein, a control shaft having on one side only thereof an intermediate deep cut shoulder portion and additional shoulder portions of less depth on either side of said intermediate shoulder portion and connected thereto by sloping surfaces, said control shaft providing cam means for selectively projecting one of the lock elements out of said shaft to cause the member engaged thereby to be connected in driving relation with said first shaft.

LUTHER RINGER.